Jan. 11, 1944.   R. C. KESTER   2,339,016
AUXILIARY CARRIAGE FOR TURNING LATHE CUTTERS
Filed June 3, 1942   3 Sheets-Sheet 1

INVENTOR.
RALPH C. KESTER.

Jan. 11, 1944.    R. C. KESTER    2,339,016
AUXILIARY CARRIAGE FOR TURNING LATHE CUTTERS
Filed June 3, 1942    3 Sheets-Sheet 2
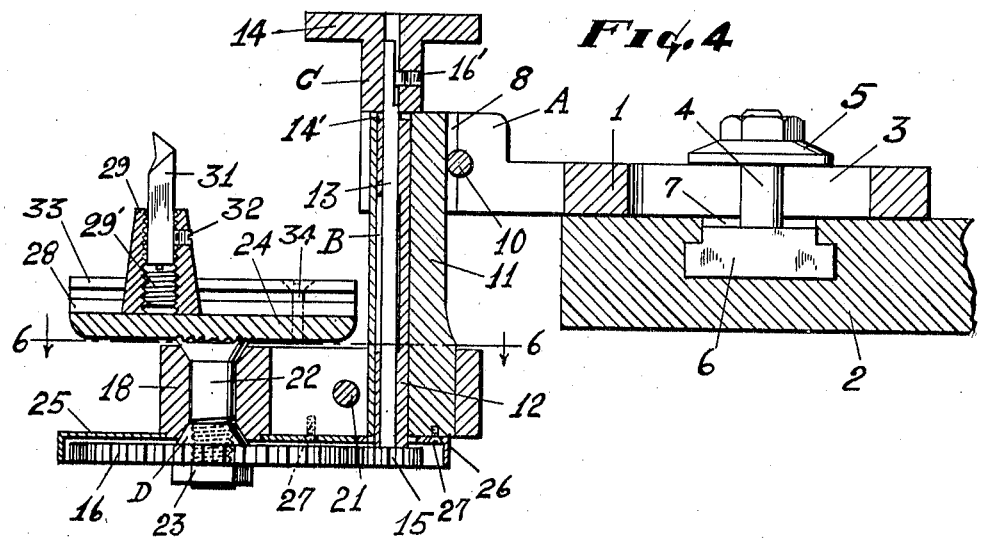
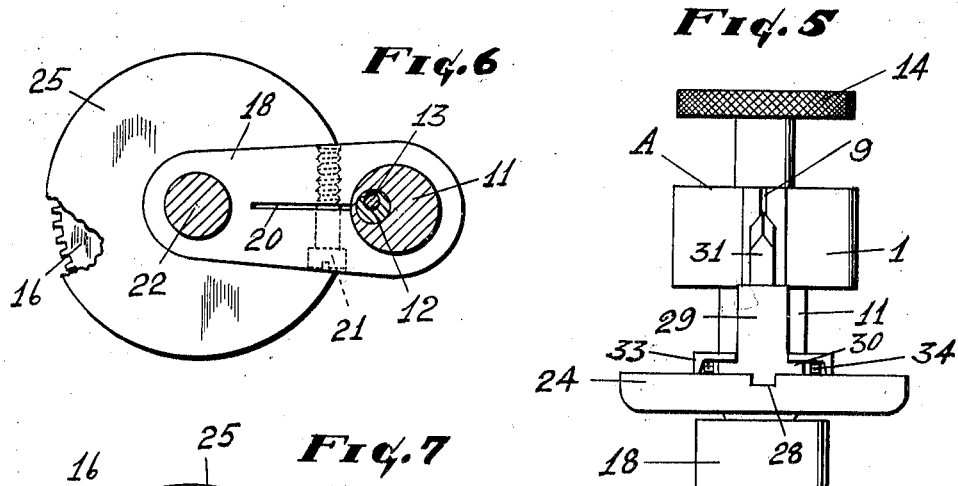
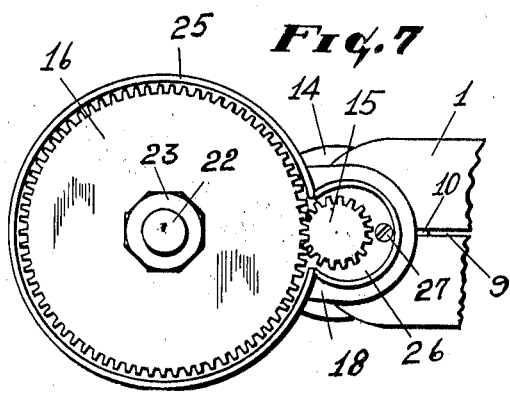
INVENTOR.
RALPH C. KESTER.
BY Y. G. Charles
atty.

Jan. 11, 1944. R. C. KESTER 2,339,016
AUXILIARY CARRIAGE FOR TURNING LATHE CUTTERS
Filed June 3, 1942 3 Sheets-Sheet 3
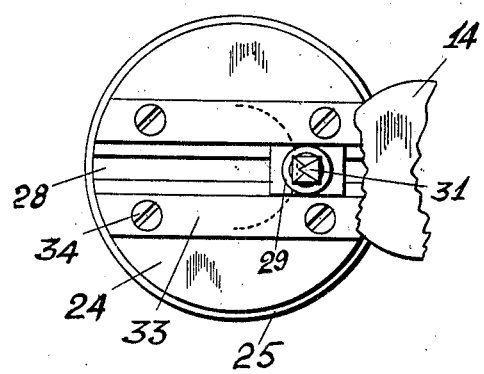
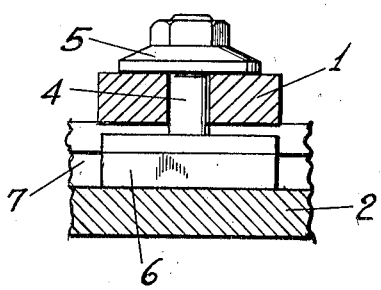
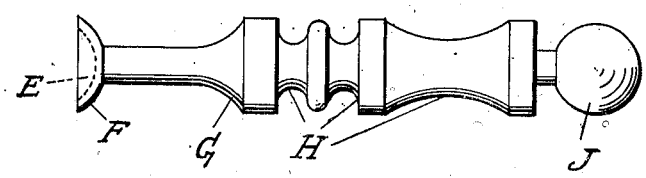
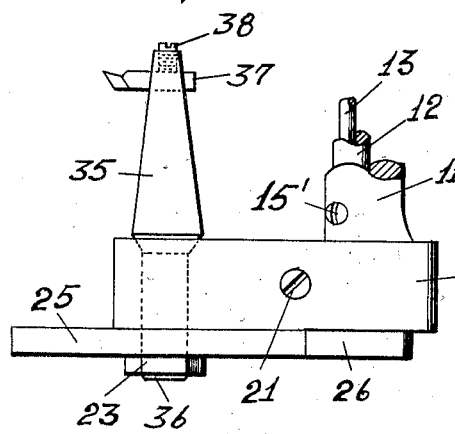
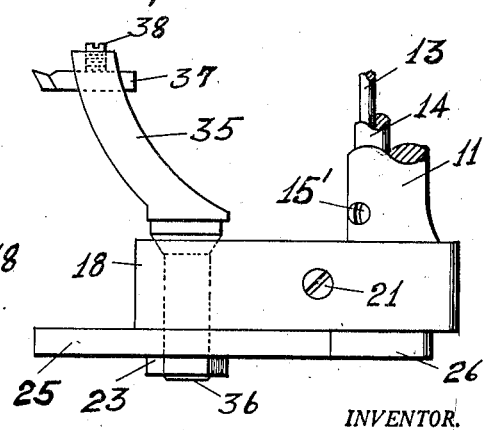
INVENTOR.
RALPH C. KESTER
BY
U. H. Charles
atty.

Patented Jan. 11, 1944

2,339,016

UNITED STATES PATENT OFFICE 2,339,016

AUXILIARY CARRIAGE FOR TURNING LATHE CUTTERS

Ralph C. Kester, Wichita, Kans.

Application June 3, 1942, Serial No. 445,596

5 Claims. (Cl. 82—12)

My invention relates to an auxiliary carriage for a turning lathe cutter, and has for one of its objects a simple and efficient means to secure the auxiliary carriage to a conventional type carriage of a turning lathe.

A further object of my invention is to provide on the auxiliary carriage a reciprocal rocking means for the cutter in such a way as to adapt the movement of the cutter to form concave or convex surfaces from a predetermined focal point along a directrix line diametrically crossing the rocking axis of the cutter carriage.

A further object of my invention is to construct an auxiliary carriage for a cutter having means to adjust the same against a worn condition that may occur in its use.

A still further object of my invention is to construct an auxiliary carriage for a cutter having a high degree of accuracy in its performance and being easily attached to the carriage of a turning lathe and easily operated.

These and other objects will hereinafter be more fully explained, reference being had to the accompanying drawings forming a part of this specification, and in which like characters will apply to like parts in the different views.

Referring to the drawings:

Fig. 4 is a sectional view through the carriage.

Fig. 5 is a front view of the carriage.

Fig. 6 is a sectional view taken on line 6—6 in Fig. 4.

Fig. 7 is an inverted plan view of the carriage showing the gears.

Fig. 8 is a plan view of the rockable disc, illustrating the position of the cutter for spherical or convex work, other parts broken away.

Fig. 9 is a section taken on line 9—9 of Fig. 3 and locking in the direction of the arrows.

Fig. 10 is an illustrative view of turned work.

Fig. 11 is a side view of the carriage illustrating a modified method of supporting the cutter.

Fig. 12 is a similar view to that of Fig. 11, illustrating a further modification for the cutter carriage.

Figure 1:
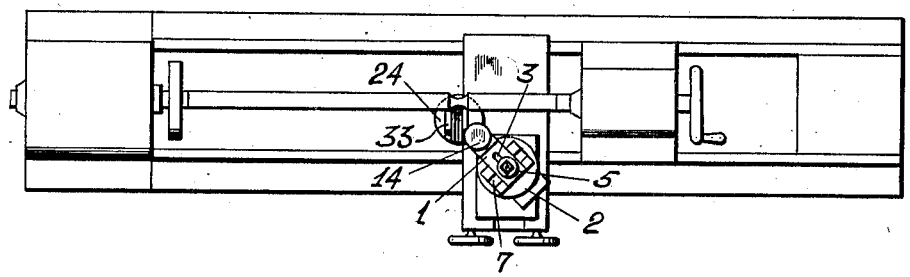
Fig. 1 is a plan view of a turning lathe bed and the auxiliary carriage for a cutter.
Figure 2:
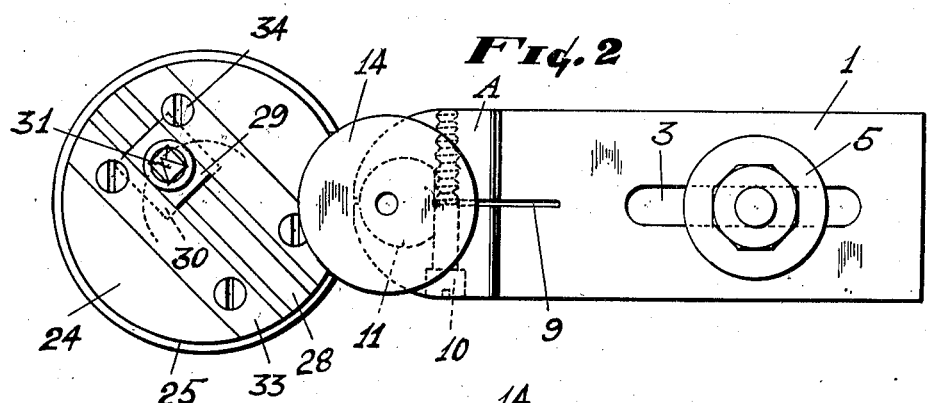
Fig. 2 is an enlarged plan view of the carriage illustrating the position of the cutter for concavity work.

My invention herein disclosed relates to a cutter carrying means consisting of a frame comprising an arm 1 seating on a carriage plate 2 of a turning lathe, the arm having an elongated slot 3 therethrough and extending longitudinally thereof, through which extends a bolt 4 having a washer 5 and a nut at the upper end thereof, while the lower end of the bolt has a shouldered block 6 secured thereto, said block adapted to slide in a groove 7 transversely crossing the said carriage plate, by which means the arm is adjustably secured to the carriage.

The forward end of said arm 1 has an aperture 8 vertically extending therethrough and a slot 9 connecting with the aperture and extending rearward a short distance for flexibility to contract the aperture as tensioned by a bolt 10 as securing means for a standard 11 positioned in the aperture and carried by the said arm at a predetermined position vertically of the standard for the purpose later described. Said standard flattened along one side thereof from its top downward to a spaced distance upward from its lower extremity, is means to prevent turning of the standard as the said bolt 10 will engage in close contact with the flattened portion but free to slide therealong should the standard be vertically moved through the aperture. The said arm adjacent its aperture is increased in thickness as at A to lengthen its grip on the standard to avoid a lateral rock of the standard from its vertical plane.

The said standard above referred to is eccentrically bored longitudinally as at B. Positioned in said bore is a longitudinally bored sleeve 12, the bore of which is eccentrically positioned and having journalled therein a shaft 13, said shaft having secured to its upper end a knurled wheel 14 to turn the shaft, while the lower end of said shaft has a toothed pinion 15 secured thereto and being in mesh with a toothed gear 16 as turning means therefor. It will be seen that the eccentric bore of the standard is to position the said shaft 13 as near as possible to the gear to reduce the diameter of its driving pinion to easily turn the gear, and to provide ample room between the standard and a rockable cutter supporting disc later described. It will also be seen that the eccentric bore of the sleeve is means to rock the pinion to a smooth running mesh with its gear to avoid a lash in gear movement to insure a uniform rock for a cutter controlled thereby.

Figure 3:
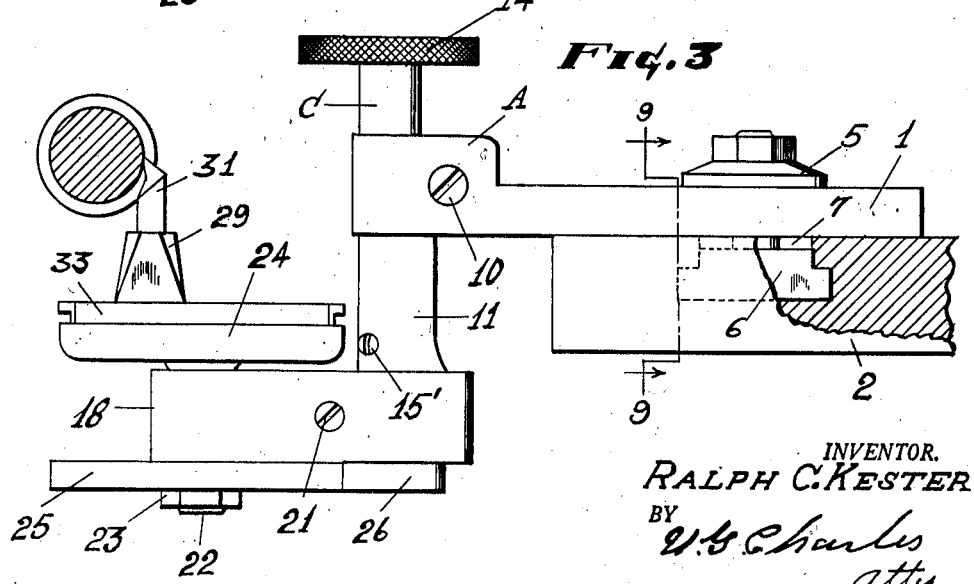
Fig. 3 is a side view of Fig. 2, partly in section.

To rock the eccentrically positioned bore of the sleeve for adjustment of the pinion carried by its shaft, the same is accomplished by a screw driver engaging in an eye 14' diametrically crossing the upper end of said sleeve to turn the same manually, and when properly adjusted the sleeve is secured by a set screw 15' positioned adjacent the lower end of the standard as shown in Fig. 3, it being understood that to turn the sleeve the knurled wheel must be removed from the shaft by loosing a set screw 16' that threadedly engages in the hub C of the wheel, seating on the flat portion of the shaft adjacent its top; furthermore the set screw engagement is means to turn the shaft by its wheel and retain the pinion in horizontal registry with the said gear.

Secured to the said standard adjacent its lower extremity is another arm 18 oppositely extending from said standard to that of the first said arm, last said arm being apertured at one end and slotted as at 20 to intersect the aperture, said arm being secured to the standard by contracting the wall of the aperture to rigid engagement with the standard by a screw 21 crossing the slot to partially close the same, contracting the aperture. The other end of said arm is apertured to receive a spindle 22 rotatable therein and the said spindle at its lower end being threaded to engage with the threaded bore of the gear 16 at its turning axis and being locked against rotation in the gear by a nut 23 as shown in Fig. 4. The said gear has a conical hub D on its upper side to engage in its respective end of said aperture and a similar cone is formed on the spindle where it integrally joins a disc 24 as turning means therefor when the said gear is turned by its pinion as heretofore described. It will be understood that a worn condition of the spindle sufficient to wabble may be overcome by drawing the conical elements toward each other by screwing the gear 16 on the spindle to provide a smooth running fit as the cones are caused to fit closely in their respective funneled ends of the aperture that coincides with the cones.

The gear and pinion are enclosed at their upper sides and toothed peripheries by a casing 25 and 26 that are secured to the under side of last said arm and standard respectively by screws 27 as shown in Figs. 4 and 7.

Diametrically crossing the upper side of disc 24 is a groove 28 to receive a tongue slidable therein said tongue extending across the lower extremity of a holder 29, said holder being bored and threaded axially and having lips 30 oppositely extending from two of its sides. Threadedly engaging in the threaded bore of the holder is a stud 29' that may be raised or lowered and upon which the shank of a cutter 31 will seat, the shank being secured by a set screw 32 when the said stud is properly positioned vertically to place the edge of the cutter practically on a horizontal plane with the turning axis of the lathe to enable the cutter in its function later described. The holder lips each have a retaining cleat 33 to secure the holder vertically on the disc and slidable thereacross for a directrix line and being stationarily secured at a point selectively by clamping the cleats to the lips by screws 34 threadedly engaging in the disc. The holder being thus positioned may be selectively secured in spaced relation from either side of the turning axis of the disc whereby a focal point is established for the cutter with respect to turning spherical or concave forms, for example, as illustrated at E, F, G, H, and J in Fig. 10, and the said Fig. 10 further illustrates other turning possibilities of the said auxiliary carriage; furthermore, the said auxiliary carriage may be secured to a standard carriage of a turning lathe at any point through an arc of 180 degrees without interfering with the reciprocal rocking movement of said disc and cutter carried thereby.

Figs. 11 and 12 illustrate a modification of the auxiliary carriage, in which views, the disc is removed and a holder 35 is provided with a similar spindle 36 to that for the disc heretofore described, consequently the said holder is connected direct to the said gear 16 and rockable therewith reciprocatingly; in this instance the holder has an opening therethrough a spaced distance downward from its upper extremity to engage an elongated cutting element 37 positioned therein and being horizontally disposed and slidable longitudinally for a predetermined extension of its cutting edge, and being secured by a set screw 38 axial with the holder as illustrated in Fig. 11. In this instance, the cutter will function only for the formation of a concavity, while the holder as formed in Fig. 12 will function for both spherical or concave forms by reversing the holder, the focal point being governed by the distance of extension from the turning axis of the holder.

To reverse the arc of the holder is merely to turn the gear through an arc of 180 degrees after which the cutter element is turned end for end and replaced in its opening, and such other modifications may be made as lie within the scope of the appended claims.

Having fully described my invention what I claim as new and desire to secure by Letters Patent is:

1. In an auxiliary carriage for turning lathes, a frame, a disc and gear means journalled on the frame to turn the disc, the frame consisting of a pair of arms and a standard connecting the arms, one arm having an elongated slot and a bolt to adjustably connect the arm to a turning lathe carriage, the gear means consisting of a pinion journalled in the standard adjacent said other arm, and a shaft extending through the standard longitudinally and having a hand wheel on one end adjacent the first said arm, the other end of said shaft being connected to the pinion to turn the same and a gear journalled on the last said arm and being in mesh with the pinion, said gear and disc being adjustably connected coaxially and being spaced apart by their respective arm, a cutter and a holder for the cutter, and guide means on the disc for the holder, the latter being movable thereacross diametrically.

2. In an auxiliary carriage for turning lathes of the class described comprising a frame and means to attach the frame in working relation to a mandrel of a turning lathe, a disc and a toothed gear adjustably connected co-axially and being journalled on the frame, a toothed pinion in mesh with the toothed gear, means to adjustably journal the toothed pinion to the frame to move said pinion toward and from the gear for smooth running fit of said gear and pinion, means to establish a directrix line diametrically crossing the disc, an elongated cylindrical cutter holder and means on one end of the holder to engage with the said directrix line establishing means to move and secure the holder at a predetermined point along the directrix line, the cutter being carried axial of the holder at its other end, and means to secure the cutter at a predetermined distance from the said other end of the cylindrical holder.

3. In an auxiliary carriage for a turning lathe, said auxiliary carriage comprising a vertically disposed standard, said standard being bored longitudinally, a sleeve adjustably mounted in the bore of the standard and means to secure the sleeve against rotation, said sleeve being longitudinally bored eccentrically, a shaft journalled in the bore of the sleeve, said shaft having a hand wheel on its upper end to turn the same, and a pinion secured to the lower end of the shaft, an arm slidably mounted on the standard adjacent its upper end, and another arm mounted adjacent the lower end, means to secure the upper arm on the standard when selectively adjusted and means to adjustably connect the upper arm to a permanent carriage of the lathe, a cutter holder journalled on the lower arm and a gear secured to the holder as turning means therefor, said gear being in mesh with said pinion as turning means for the gear, means to secure a cutter to the holder, and the pinion being rocked by the sleeve to adjust the same in smooth running mesh with the gear.

4. In an auxiliary carriage for tools, a cylindrical standard longitudinally bored therethrough and vertically disposed, an arm being transversely bored at one end thereof and adapted to engage on the standard adjacent its lower end and means to secure the arm permanently to the standard, another arm transversely bored adjacent one end thereof as carrying means for the standard, said standard being slidable longitudinally in the bore of said second arm to raise and lower the lower arm, and means to secure the standard to said first arm at a predetermined point longitudinally of the standard, and means to secure last said arm adjustably to a permanent carriage of a turning lathe, an eccentrically bored sleeve journalled in the bore of the standard, and a shaft extending through the bore of the sleeve, said shaft having a hand wheel on one end to turn the same, and a pinion secured to the other end of the shaft, a gear in mesh with the pinion, said pinion being adjusted for smooth running fit with the gear by turning the sleeve, and means to secure the sleeve against turning movement when the pinion is properly adjusted, said gear being journalled on the lower arm and having a tool carrying means secured thereto and turned thereby.

5. In an auxiliary carriage for turning lathes, a frame comprising a standard and an arm secured to the standard to extend at right angle therefrom and another arm mounted on the standard and adapted to slide longitudinally thereon, means to adjustably connect last said arm to a carriage of a turning lathe, a cutter holder and a disc and guide means secured to the disc as slidable supporting means for the holder, said disc rotatably mounted on said first arm, a gear to turn the disc, means carried by the standard to manually turn the gear whereby when the holder is secured on one side of the turning axis of the disc a concavity will be formed by the tool and when said holder is secured on the opposite side of said turning axis a spherical form may be turned by the cutter without changing the position of the cutter as carried by the holder.

RALPH C. KESTER.